United States Patent
Sun

(10) Patent No.: US 6,812,607 B1
(45) Date of Patent: Nov. 2, 2004

(54) AUXILIARY COUPLING DISK FOR MINIATURE VIBRATION VOICE-COIL MOTORS

(75) Inventor: Chien-Chung Sun, Taipei (TW)

(73) Assignee: Risun Expanse Corp., Taipei (TW)

( * ) Notice: Subject to any disclaimer, the term of this patent is extended or adjusted under 35 U.S.C. 154(b) by 52 days.

(21) Appl. No.: 10/633,648

(22) Filed: Aug. 5, 2003

(51) Int. Cl.⁷ .............................................. H02K 7/06
(52) U.S. Cl. ....................................................... 310/81
(58) Field of Search .............................. 310/81, 89, 91, 310/268, 40 MM

(56) References Cited

U.S. PATENT DOCUMENTS

| | | | | |
|---|---|---|---|---|
| 5,036,239 A | * | 7/1991 | Yamaguchi | 310/268 |
| 5,471,103 A | * | 11/1995 | Fujii | 310/81 |
| 5,793,133 A | * | 8/1998 | Shiraki et al. | 310/81 |
| 6,417,589 B1 | * | 7/2002 | Kuyama et al. | 310/81 |
| 6,573,627 B2 | * | 6/2003 | Sun | 310/81 |
| 2002/0195890 A1 | | 12/2002 | Sun | |

* cited by examiner

*Primary Examiner*—Thanh Lam
(74) *Attorney, Agent, or Firm*—Rabin & Berdo, P.C.

(57) ABSTRACT

An auxiliary coupling disk for miniature vibration voice-coil motors aims to couple with a magnetic weight element to change the relative position of the auxiliary disk eccentric from the rotational center of the motor so that the magnetic weight element can generate vibration during rotation. The auxiliary coupling disk further can alter the vibration of the motor. The auxiliary coupling disk has at least one removable member located in the eccentric direction opposite to the magnetic weight element. The removable member may be selectively removed according to requirements to reduce the weight that offsets vibration to increase vibration.

4 Claims, 3 Drawing Sheets

AUXILIARY COUPLING DISK FOR MINIATURE VIBRATION VOICE-COIL MOTORS

FIELD OF THE INVENTION

The invention relates to an auxiliary coupling disk adopted for use on a miniature vibration voice-coil motor to couple with a magnetic weight element to enable the magnetic weight element to move away from motor rotational center to generate desired vibration during rotation.

BACKGROUND OF THE INVENTION

U.S. Patent publication No. 20020195890 entitled "DC BRUSHLESS VOICE-COIL VIBRATION MOTOR" discloses a DC brush less voice-coil vibration motor that has an induction coil and a magnetic weight element which has a plurality of coplanar magnetic poles to serve as the stator and the rotor of a miniature motor. It further provides an auxiliary coupling disk to couple on a spindle in a coaxial manner. The auxiliary coupling disk is made from magnetic material. The magnetic weight element is directly attracted and attached to the auxiliary coupling disk. The magnetic weight element has a smaller diameter than the auxiliary coupling disk. Hence the magnetic weight element may move to one side of the auxiliary coupling disk and move away eccentrically from the spindle. When electric energy is input in the induction coil and an induction magnetic field is generated to produce interaction with the magnetic weight element, the magnetic weight element may generate rotational energy. As the magnetic weight element is eccentric from the spindle, the inertia of the magnetic weight element will generate vibration energy during rotation.

By means of the patent mentioned above that consists of an induction coil and a magnetic weight element of a plurality of coplanar magnetic poles, a miniature motor with a diameter smaller than 20 mm can be produced. The eccentric magnetic weight element can produce required vibration. It can be used in mobile phones or the like to provide incoming call vibration. The vibration energy depends on the moving distance of the magnetic weight element spaced from the spindle. The greater the moving distance, the greater the vibration becomes. Smaller moving distance also produces smaller vibration. Hence to increase the vibration, the simplest way is to shrink the diameter of the magnetic weight element. However, the magnetic weight element must have sufficient space to interact with the induction coil to generate rotation. Hence there is a dimensional limitation for the magnetic weight element. The actual size of the DC brush less voice-coil vibration motor made according to the aforesaid patent is about 20 mm or less. As the dimension of the magnetic weight element is limited, the vibration generated by the DC brush less voice-coil vibration motor is also limited.

SUMMARY OF THE INVENTION

Because the miniature DC brush less voice-coil vibration motors made by the conventional techniques have vibration constraint, the primary object of the invention is to provide an auxiliary coupling disk to change vibration within a limited space so that vibration energy can be increased for the DC brush less voice-coil vibration motor within a limited space.

The auxiliary coupling disk for miniature vibration voice-coil motors of the invention includes an auxiliary coupling disk, which is a circular made from magnetic material. The circular disk has a vertical peripheral wall and an aperture in the center. One side of the circular disk close to the peripheral wall has one or more removable members, which may be removed from the circular disk. By means of such a design, the magnetic weight element may move away from the spindle opposing the removable member. When the magnetic weight element has a maximum eccentric displacement relative to the auxiliary coupling disk, if there is a desire to increase vibration, the removable members may be selectively removed to reduce the weight of the circular disk to offset the magnetic weight element, to increase vibration.

The auxiliary coupling disk for miniature vibration voice-coil motors of the invention may include one or more removable members in a limited space. Through reducing the weight of the circular disk to offset the magnetic weight element, the removable members may be selectively removed according to requirements to adjust and increase vibration.

The foregoing, as well as additional objects, features and advantages of the invention will be more readily apparent from the following detailed description, which proceeds with reference to the accompanying drawings.

DESCRIPTION OF THE PREFERRED EMBODIMENTS

The auxiliary coupling disk for miniature vibration voice-coil motors of the invention is mounted onto a miniature vibration voice-coil motor, which is constructed like the one described in U.S. Patent publication No. 20020195890, details of the motor are omitted.

Figure 1:
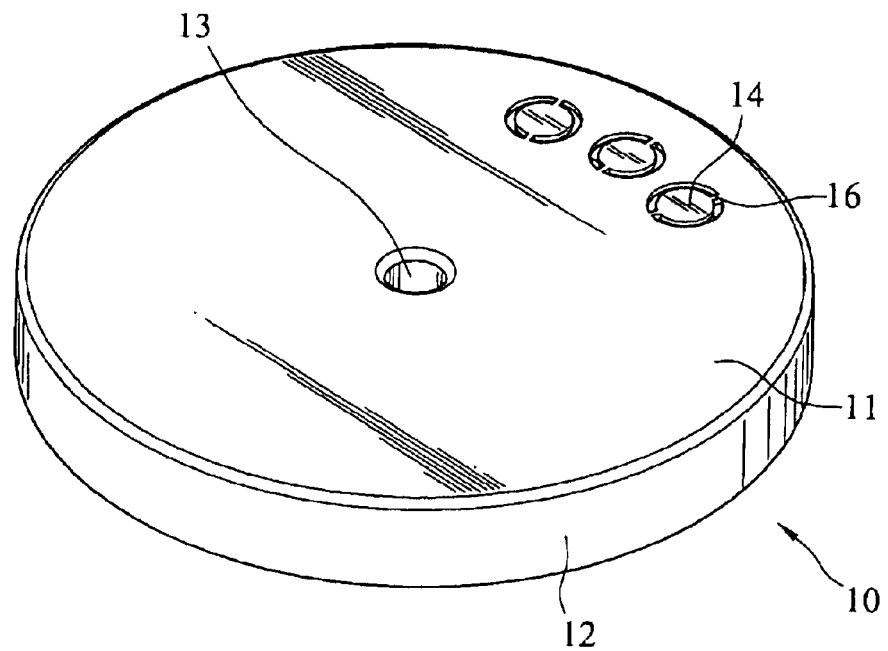
FIG. 1 is a schematic view of the invention with removable elements mounted onto the auxiliary coupling disk.
Figure 2:
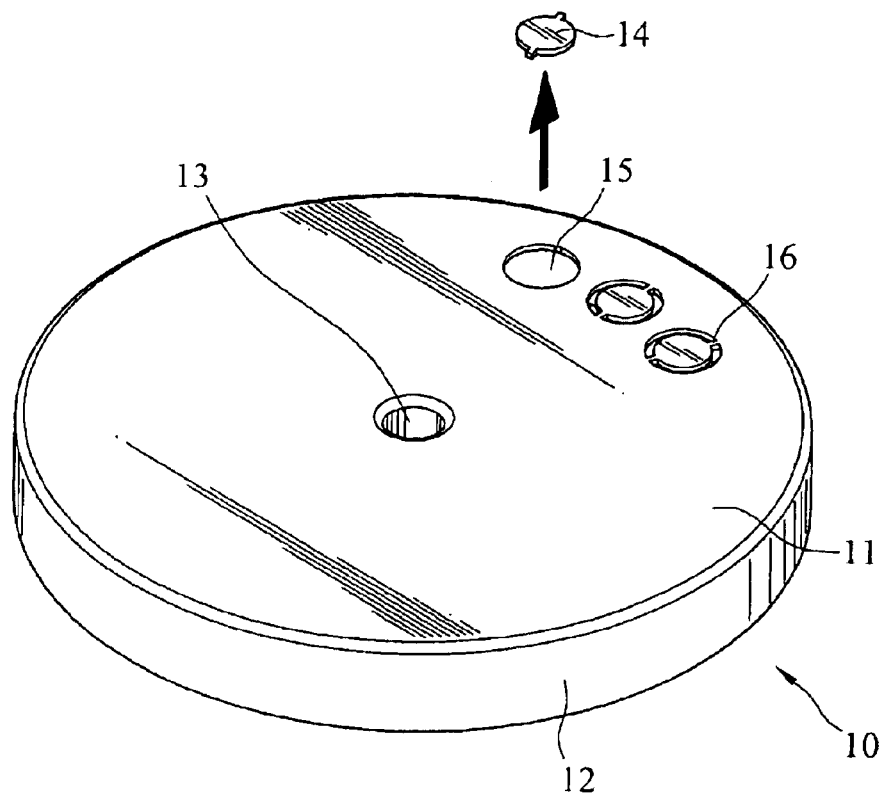
FIG. 2 is a schematic view of the invention with one removable element removed from the auxiliary coupling disk.

Referring to FIGS. 1 and 2, the auxiliary coupling disk 10 for miniature vibration voice-coil motors of the invention is formed in a circular disk 11 made of magnetic material (metal such as iron, cobalt, nickel or the like). It has a vertical peripheral wall 12 and an aperture 13 in the center to couple with a spindle (not shown in the drawings) in a concentric fashion. On one side of the circular disk 11 close to the peripheral wall 12, there is one or more removable member 14. The circular disk 11 has at least one opening 15, which mates the removable member 14 and is slightly larger than the removable member 14. The removable member 14 has a plurality of connecting members 16 to couple with the opening 15 in a coplanar manner. The removable member 14 may be removed from the opening 15 when an external force is applied so that the weight of the circular disk 11 may be reduced by the weight of the removed removable member 14. Of course, when more removable members 14 are removed, more weight is reduced from the circular disk 11. According the present mechanical fabrication techniques, the auxiliary coupling disk 10 may be made by stamping or punching the circular disk 11 to form two opposing troughs. Then the removable members 14 may be formed easily to couple with the circular disk 11.

Figure 3A:
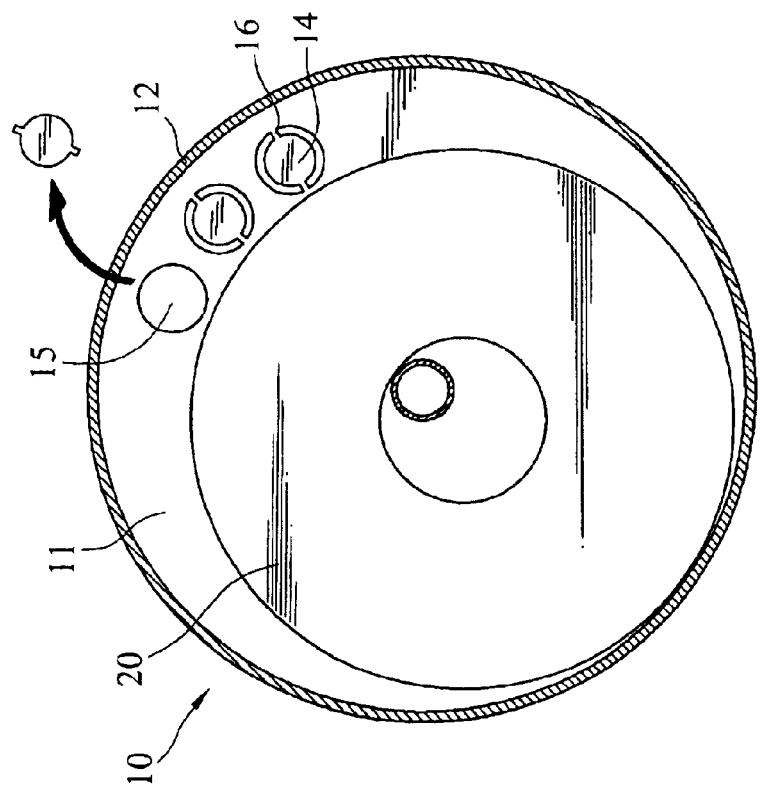
FIGS. 3A and 3B are schematic views of the invention showing the relationship of the invention and the magnetic weight element.
Figure 3B:
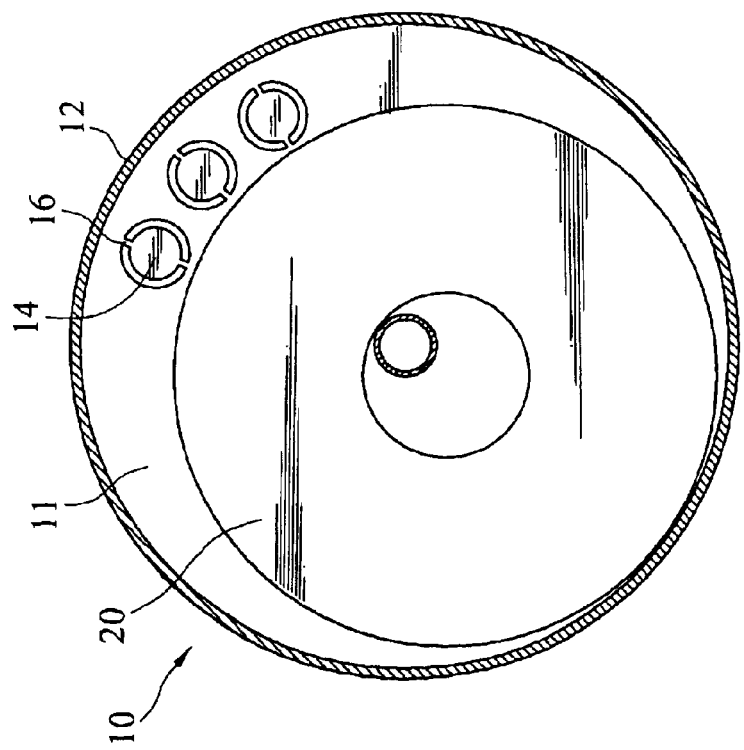

Refer to FIGS. 3A and 3B for the positional relationship between the magnetic weight element 20 and the auxiliary coupling disk 10. The magnetic weight element 20 is a magnet, which has a plurality of coplanar magnetic poles to serve as the rotor of a miniature vibration voice-coil motor (not shown in the drawings). The magnetic weight element 20 is magnetic and has a smaller diameter than the circular disk 11 to be attracted and attached to the circular disk 11, and is confined within the peripheral wall 12. The magnetic weight element 20 may be moved towards the peripheral wall 12 for a distance to become eccentric from the center of the auxiliary coupling disk 10. Thus when the magnetic weight element 20 rotates, the eccentric distance will generate vibration energy. And the greater the distance, the greater the vibration occurs. By contrast, the smaller the distance, the smaller the vibration.

Based on the design of the invention, the magnetic weight element 20 may be moved eccentrically towards a position opposite to where the removable members 14 are located. When there is a desire to increase vibration, one or more removable members 14 may be selectively removed from the circular disk 11 to reduce the weight in the eccentric direction opposite to the magnetic weight element 20. Namely, a weight to offset the vibration of the magnetic weight element 20 is reduced. Thus more removable members 14 are removed, more weight of the circular disk 11 is reduced, and vibration increases. Therefore, vibration can be adjusted according to the actual requirements of the product.

Figure 4:
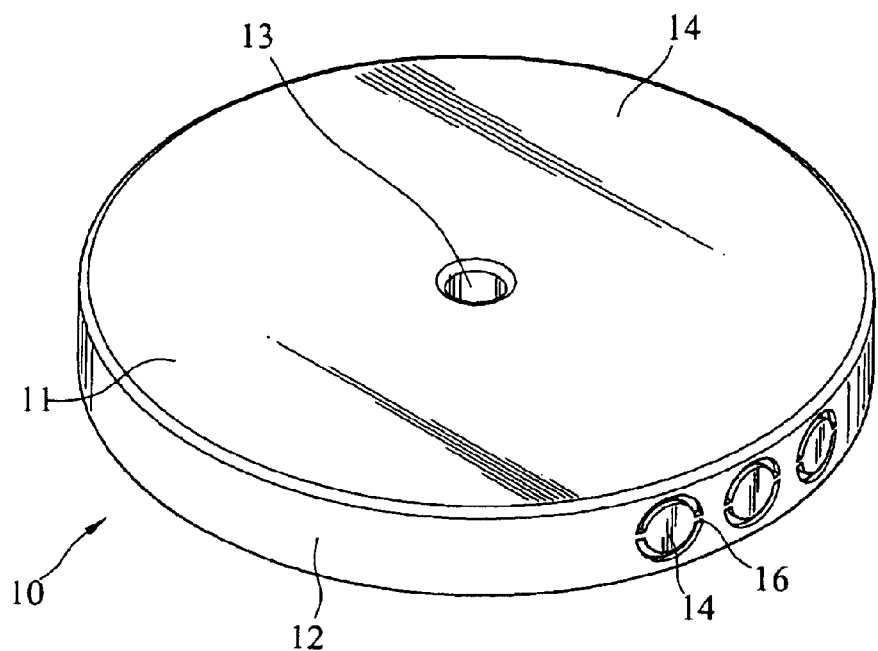
FIG. 4 is a schematic view of a second embodiment of the invention.

Refer to FIG. 4 for a second embodiment of the invention. It is for miniature vibration voice-coil motors that have a diameter smaller than 20 mm and a thickness smaller than 3 mm. The auxiliary coupling disk 10 has a peripheral wall about 1 mm. The circular disk 11 of the auxiliary coupling disk 10 has removable members 14 located on the position opposite to the eccentric direction of the magnetic weight element 20. By removing the removable members 14, the weight of the auxiliary coupling disk 10 may be reduced. Applying this technique, the removable members 14 may be located on the peripheral wall 12 to achieve the same effect.

Figure 5:
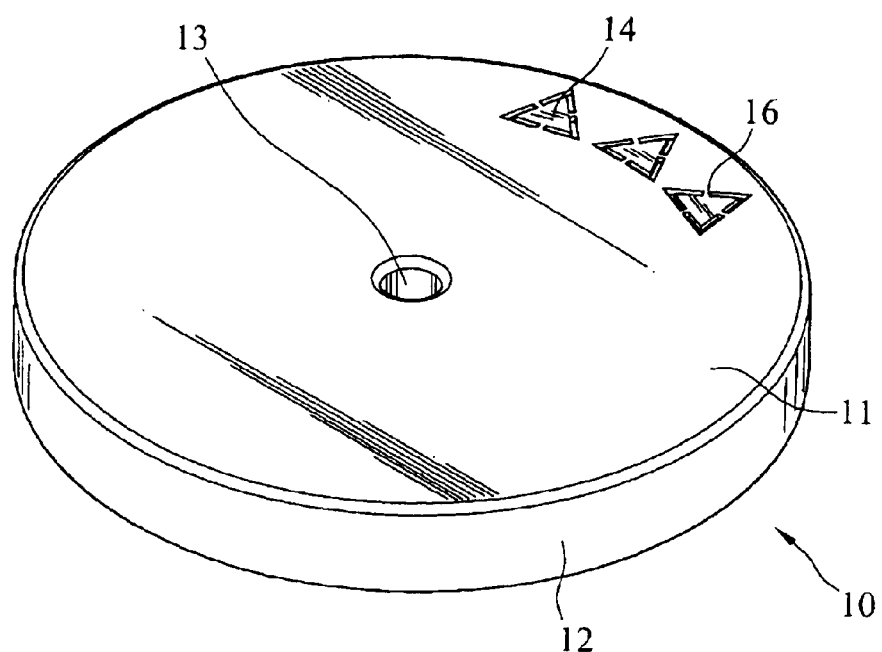
FIG. 5 is a schematic view of a third embodiment of the invention.

Refer to FIG. 5 for a third embodiment of the invention. The troughs formed on the circular disk 11 by stamping may be any desired geometric shape such as a circle, square, or triangle. The removable elements 14 also may be formed in any desired geometric shape such as a circle, square, or triangle.

While the preferred embodiments of the invention have been set forth for disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. An auxiliary coupling disk for miniature vibration voice-coil motors to be installed in a miniature vibration voice-coil motor comprising a circular coupling disk made of magnetic material to couple with a magnetic weight element, the circular coupling disk including a circular disk which has a vertical peripheral wall and an aperture in the center thereof;

wherein the circular disk has at least one removable member located thereon on one side closed to the peripheral wall.

2. The auxiliary coupling disk for miniature vibration voice-coil motors of claim 1, wherein the removable member is located on the peripheral wall.

3. The auxiliary coupling disk for miniature vibration voice-coil motors of claim 1, wherein the removable member is formed in a desired geometric shape.

4. The auxiliary coupling disk for miniature vibration voice-coil motors of claim 1, wherein the removable member is formed by directly stamping the circular disk to form two opposing troughs, the removable member having a plurality of connecting members to couple with the circular disk.

* * * * *